United States Patent
Fuse et al.

[19]

[11] Patent Number: 5,923,458
[45] Date of Patent: Jul. 13, 1999

[54] FREQUENCY MODULATOR

[75] Inventors: Masaru Fuse, Toyonaka; Katsuyuki Fujito, Higashiosaka; Koji Kikushima, Ichikawa, all of Japan

[73] Assignees: Matsushita Electric Industrial Co., Ltd., Osaka-Fu; Nippon Telegraph and Telephone Corporation, Tokyo, both of Japan

[21] Appl. No.: 08/985,357

[22] Filed: Dec. 4, 1997

[30] Foreign Application Priority Data

Dec. 5, 1996 [JP] Japan ................................. 8-325740

[51] Int. Cl.$^6$ .............................. G02F 1/01; H04B 10/04
[52] U.S. Cl. .......................... 359/278; 359/182; 372/28; 372/32
[58] Field of Search .................................... 359/181, 182, 359/184, 187, 191, 278; 372/28, 32

[56] References Cited

U.S. PATENT DOCUMENTS

| | | | |
|---|---|---|---|
| 5,272,559 | 12/1993 | Hoa et al. | 359/191 |
| 5,457,563 | 10/1995 | Van Deventer | 359/191 |
| 5,510,922 | 4/1996 | Naito | 359/124 |
| 5,544,183 | 8/1996 | Takeda | 372/38 |
| 5,568,305 | 10/1996 | Naito | 359/191 |
| 5,768,449 | 6/1998 | Fuse et al. | 385/1 |
| 5,777,773 | 7/1998 | Epworth et al. | 359/182 |

OTHER PUBLICATIONS

K. Kikushima et al. "150–km Non–Repeated 60–Channel AM–Video Transmission Emplying Optical Heterodyne AM/FM Converter", ECOC '95, Th.L.3.1, Brussels, 1995, pp. 1047–1050.

*Primary Examiner*—Georgia Epps
*Assistant Examiner*—Margaret Burke
*Attorney, Agent, or Firm*—Wenderoth, Lind & Ponack, L.L.P.

[57] ABSTRACT

An electrical signal to be frequency-modulated is branched into first and second signals. An FM laser 102 oscillates light having a wavelength $\lambda 1$ in a steady state condition, and outputs an optical signal obtained by converting an amplitude change in the inputted first signal into an optical intensity change and an optical frequency change. An optical detecting portion 106, to which the optical signal from the FM laser 102 and light having a wavelength $\lambda 0$ outputted from a local light source 104 are inputted, converts an optical intensity modulation component of the inputted optical signal as a current amplitude change by operating square-law detection characteristics, and generates a beat signal at a frequency corresponding to a difference in wavelength $\Delta\lambda$ between the two inputted optical signals. A discrimination portion 110 discriminates using a threshold value generated on the basis of the second signal and converts the beat signal into the pulse signal. A high frequency component of the pulsed beat signal is removed by an LPF 311. Consequently, it is possible to generate an ideal wide band FM modulation signal by removing an amplitude variation and an average value variation from the beat signal generated by using an optical frequency modulating operation of a laser diode and heterodyne detection.

6 Claims, 7 Drawing Sheets

INPUTTED SIGNAL TO DISCRIMINATION PORTION 110

OUTPUTTED SIGNAL FROM DISCRIMINATION PORTION 110

OUTPUTTED SIGNAL FROM LPF 311

WAVEFORM AND SPECTRUM OF IDEAL FM SIGNAL

WAVEFORM AND SPECTRUM OF SIGNAL HAVING AN OPTICAL IM MODULATION COMPONENT AND FM MODULATION COMPONENT (FM+IM SIGNAL)

WAVEFORM AND SPECTRUM OF SIGNAL PRODUCED BY SUPERIMPOSING IM-DD COMPONENT ON FM+IM SIGNAL
(AVERAGE VALUE VARIES DEPENDING ON IM-DD COMPONENT)

FREQUENCY MODULATOR

BACKGROUND OF THE INVENTION

1. Field of the Invention

The present invention relates generally to a frequency modulator (hereinafter referred to as an FM modulator), and more particularly, to an FM modulator for generating a high-frequency and wide band frequency modulation signal by an optical signal processing technique.

2. Description of the Background Art

FIG. 4 is a block diagram showing the general construction of a conventional FM modulator. In FIG. 4, the conventional FM modulator comprises a signal source 101, a frequency modulation laser (hereinafter referred to as an FM laser) 102, a first optical waveguide portion 103, a local light source 104, a second optical waveguide portion 105, and an optical detecting portion 106. The construction and the operations of the conventional FM modulator will be described in detail.

The signal source 101 outputs an electrical signal which is the original signal to be frequency-modulated. The FM laser 102, which is composed of a laser diode, for example, oscillates light having a wavelength λ1 in a steady state condition so that an injection current to the FM laser 102 is constant. When the injection current to the FM laser 102 is amplitude-modulated by the electrical signal outputted from the signal source 101, its wavelength (or its optical frequency) is modulated. Thereby, FM laser 102 outputs an optical frequency modulation signal having the wavelength λ1 at the center. And then, an optical intensity of the outputted signal from the FM laser 102 is simultaneously modulated as well as its wavelength. The first optical waveguide portion 103 guides the optical frequency modulation signal outputted from the FM laser 102. The local light source 104 outputs light having a wavelength λ0 which differs by a predetermined amount Δλ A from the wavelength λ1 of the FM laser 102. The second optical waveguide portion 105 guides the unmodulated light from the local light source 104. Each light guided by the first and second optical waveguide portions 103 and 105 is inputted to the optical detecting portion 106.

The optical detecting portion 106, which is composed of a photodiode operating the square-law detection, for example, has the properties of converting an optical intensity modulation component of the inputted light into a current amplitude modulation component (hereinafter referred to as an IM-DD component) and, generating, when two lights having different optical wavelengths are inputted to the optical detecting portion 106, a beat component at a frequency corresponding to the difference in wavelength between the two lights (this operation is referred to as a heterodyne detection). Consequently, the optical detecting portion 106 outputs, when the outputted optical signal from the FM laser 102 and the outputted light from the local light source 104 are inputted thereto, a beat signal at a frequency corresponding to the difference in wavelength Δλ between the two lights. The beat signal is an FM modulation signal whose original signal is the outputted signal from the signal source 101.

As described in the foregoing, when suitable FM laser 102 and suitable local light source 104 are used in the FM modulator which converts an electrical signal into a frequency modulation signal by utilizing such properties that the wavelength of the laser diode or the like changes according to the injection current thereto(hereinafter referred to as wavelength chirping) and the heterodyne detection, an FM modulation performance having a higher frequency (not less than several GHz) and having a larger amount of frequency deviation (not less than several hundred MHz) can be realized, as compared with that in a system using a normal electric devices. Consequently, it is possible to also modulate a wide band signal such as a multi-channel frequency division multiplex signal used in CATV transmission or the like.

Although an AM (amplitude modulation) transmission method is currently used most commonly in the CATV, the method requires very good noise characteristics (for example, SNR: not less than 51 dB) on a transmission system. On the other hand, an FM (frequency modulation) transmission method has the advantage that it does not require noise characteristics as good as that of the AM transmission method, although it requires a wider transmission band. If an AM-FDM (amplitude modulation-frequency division multiplex) signal currently used in the CATV is transmitted after being simultaneously converted into an FM modulation signal using the FM modulator of the above-mentioned construction, an AM signal inherently requiring a high signal-to-noise ratio (SNR) can be transmitted using a transmission path which is not superior in noise characteristics (see a document; K. Kikushima et.al. "150-km Non-Repeated 60-Channel AM-Video Transmission Employing Optical Heterodyne AM/FM Converter", ECOC '95, Th.L. 3.1, Brussels, 1995, for example).

In the FM modulator shown in FIG. 4, the generated FM modulation signal has an amplitude variation and an average value variation due to an optical intensity modulation component produced in the FM laser 102. The amplitude variation and the average value variation cause waveform distortion at the demodulation of the FM modulation signal. The foregoing will be specifically described.

FIG. 5(a), 5(b) and 5(c) are schematic diagrams for explaining the relationship between the spectrum and the waveform of a signal in each portion of the FM modulator shown in FIG. 4. When the optical signal outputted from the FM laser 102 has only an optical frequency modulation component, an ideal FM modulation signal having no amplitude variation and no average value variation is generated, as shown in FIG. 5(a). That is to say, the spectrum of the heterodyne detection component has a shape, which is bilaterally symmetrical about a center of frequency fc corresponding to the difference in wavelength (λ1−λ0) between the FM laser 102 and the local light source 104, like the ideal FM modulation signal.

On the other hand, as described above, when the optical signal outputted from the FM laser 102 has both an optical intensity modulation(IM modulation) component and an optical frequency modulation component at the same time, the spectrum of a heterodyne detection component has a shape which is bilaterally asymmetrical, and the waveform thereof has an amplitude variation (an IM modulation component), as shown in FIG. 5(b) (such a signal is hereinafter referred to as an FM+IM signal).

Furthermore, in the FM modulator, an IM-DD component, that is to say, a component produced by a square-law detecting the optical intensity modulation component in the optical detecting portion 106 is superimposed on the FM+IM signal. Therefore, the FM modulator outputs an FM+IM signal whose average value (or low frequency component) varies depending on the IM-DD component as an FM modulation signal, as shown in FIG. 5(c).

Description is now made of an FM demodulation circuit for demodulating the wide band FM modulation signal generated by the FM modulator. FIG. 6 is a block diagram showing the typical construction of such an FM demodulation circuit. In FIG. 6, the FM demodulation circuit comprises a discrimination portion 601, a delay portion 602, an AND gate 603, and a low-pass filter (hereinafter referred to as LPF) 604. In FIG. 6, a signal waveform in each portion in a case where the ideal FM modulation signal (see FIG. 5(a)) is inputted to the FM demodulation circuit is together illustrated.

The discrimination portion 601, which is composed of a logic element such as an AND gate, discriminates the inputted FM modulation signal with a predetermined threshold value Vref and converts the FM modulation signal into a pulse signal (a logical signal). Further, the discrimination portion 601 has two output ports for outputting two branched pulse signals. The pulse signal outputted from one of the output ports is directly inputted to the AND gate 603. The pulse signal outputted from the other output port, after being delayed by a predetermined amount of propagation delay through the delay portion 602, is inputted to the AND gate 603. The AND gate 603 generates an AND signal of the inputted two pulse signals. The LPF 604 passes only a predetermined low frequency component corresponding to an occupied frequency band of the electrical signal outputted from the above-mentioned signal source 101, thereby to obtain an FM demodulation signal.

An amplitude variation component of the FM demodulation signal obtained as described above uniquely corresponds to a frequency variation component of the FM modulation signal. As already described, however, it is impossible to generate an ideal FM modulation signal in the FM modulator. The FM modulation signal has an amplitude variation (an IM variation component) and an average value variation (an IM-DD component) (see FIG. 5 (c)). The amplitude variation component can be removed when the FM modulation signal is converted to the pulse signal through the discrimination portion 601 of the FM demodulation circuit, while the average value variation component cannot be removed by the discrimination through the discrimination portion 601. That is to say, in such a structure that the FM modulation signal is discriminated at a fixed threshold value Vref as in the FM demodulation circuit shown in FIG. 6, accurate discrimination is difficult, so that the waveform of the FM demodulation signal is distorted, as also apparent from FIG. 7.

As described in the foregoing, the FM modulator utilizing an optical frequency modulating operation of the laser diode and heterodyne detection has a wider band frequency modulation performance, as compared with that of an FM modulator using an electrical devices, and is in prospect as a system for making it possible to perform simultaneous frequency modulation of a multi-channel signal. However, an amplitude variation and an average value variation occur in the FM modulation signal produced in that way. Therefore, it is difficult to perform an accurate FM demodulation and the quality of the demodulation signal degrades easily.

SUMMARY OF THE INVENTION

Therefore, an object of the present invention is to provide a frequency modulator for removing an amplitude variation and an average value variation of a beat signal (FM modulation signal) generated by utilizing an optical frequency modulating operation of a laser diode and heterodyne detection.

In order to attain the above-mentioned object, the present invention has the following aspects.

A frequency modulator according to a first aspect comprises a signal source for outputting an electrical signal, a branch portion for branching the electrical signal outputted from the signal source into a first signal and a second signal in a predetermined phase relationship, a frequency modulation laser (hereinafter referred to as an FM laser) which has the properties of oscillating light having a wavelength $\lambda 1$ in a steady state condition so that the inputted electrical signal does not change and uniquely converting an amplitude change in the inputted electrical signal into an optical frequency change as well as uniquely converting the amplitude change into an optical intensity change, for converting the first signal into an optical signal, a first optical waveguide portion for guiding the outputted optical signal from the FM laser, a local light source for outputting light having a wavelength $\lambda 0$ which differs by a predetermined amount $\Delta\lambda$ from the wavelength $\lambda 1$ of the FM laser, a second optical waveguide portion for guiding the outputted light from the local light source, an optical detecting portion which has the properties of converting an optical intensity change in the inputted light into a current amplitude change by operating square-law detection and producing, when two-lights having different wavelengths are inputted thereto, a beat component at a frequency corresponding to a difference in wavelength between the two lights, for outputting, when the outputted optical signal from the FM laser guided by the first optical waveguide portion and the outputted light from the local light source guided by the second optical wavelength portion are inputted, a beat signal at a frequency corresponding to the difference in wavelength $\Delta\lambda$ between the two optical signals, and a discrimination portion for converting, when the beat signal outputted from the optical detecting portion and the second signal outputted from the branch portion are inputted, the inputted beat signal into the pulsed beat signal, utilizing the instantaneous level of the inputted second signal as a threshold value.

A frequency modulator according to a second aspect is characterized by further comprising, in the first aspect, an amplitude adjusting portion for amplifying or attenuating the second signal outputted from the branch portion by a predetermined gain or loss to adjust the amplitude of the second signal, and a delay adjusting portion for adjusting the amount of propagation delay of the second signal outputted from the branch portion, the predetermined gain or loss and the amount of propagation delay being so set that a frequency change in the outputted pulse signal from the discrimination portion and a frequency change in the beat signal correspond with each other.

A frequency modulator according to a third aspect is characterized in that in the second aspect, the branch portion branches the inputted electrical signal into first and second electrical signals which have an in-phase relationship to each other, the delay adjusting portion adjusts the amount of propagation delay to delay the second signal so that a propagation time t1 elapsed until the first signal reaches the discrimination portion from the branch portion via the FM laser and the optical detecting portion and a propagation time t2 elapsed until the second signal reaches the discrimination portion from the branch portion via the amplitude adjusting portion and the delay adjusting portion are equal to each other, and the amplitude adjusting portion makes such an adjustment that the amount of variation in the level of the second signal inputted to the discrimination portion correspond with the amount of variation in the average value of the beat signal inputted to the discrimination portion.

A frequency modulator according to a fourth to sixth aspect is characterized by further comprising, in first to third aspects, a low-pass filter for passing, when the outputted signal from the discrimination portion is inputted, only a low frequency component of not more than a predetermined frequency.

In any of the first to sixth aspects, the beat signal outputted from the optical detecting portion is discriminated at a threshold value, which changes on the time basis, to be converted into the pulse signal, and then the level of the second signal outputted from the branch portion is used as the threshold value. The second signal changes on the time basis in correspondence to an average value variation of the beat signal (the FM modulation signal). Consequently, the beat signal is discriminated using the second signal as a threshold value, to absorb an amplitude variation and the average value variation of the beat signal, and is accurately converted into the pulse signal. Therefore, it is possible to generate a frequency modulation signal with the amplitude variation and the average value variation removed.

Particularly in the second aspect, the amplitude adjusting portion and the delay adjusting portion respectively set the amplitude and the amount of propagation delay of the second signal used as the threshold value most suitably, so that the discrimination portion more accurately converts the beat signal into the pulse signal. Therefore, it is possible to generate a frequency modulation signal having no amplitude variation and average value variation.

Particularly in the third aspect, the first signal and the second signal are so branched that they have an in-phase relationship. The propagation time t1 elapsed until the first signal reaches the discrimination portion from the branch portion via the FM laser and the optical detecting portion and the propagation time t2 elapsed until the second signal reaches the discrimination portion from the branch portion via the amplitude adjusting portion and the delay adjusting portion are so set as to be equal to each other, and the variation in the instantaneous level of the second signal inputted to the discrimination portion is so set as to correspond with the average value variation of the beat signal inputted to the discrimination portion. Therefore, it is possible to generate an ideal FM modulation signal having no amplitude variation and average value variation.

Particularly in the fourth to sixth aspect, the low-pass filter removes an extra high frequency component produced in converting the beat signal into the pulse signal through the discrimination portion. Therefore, it is possible to generate a more ideal FM modulation signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (1) First Embodiment

Figure 1:
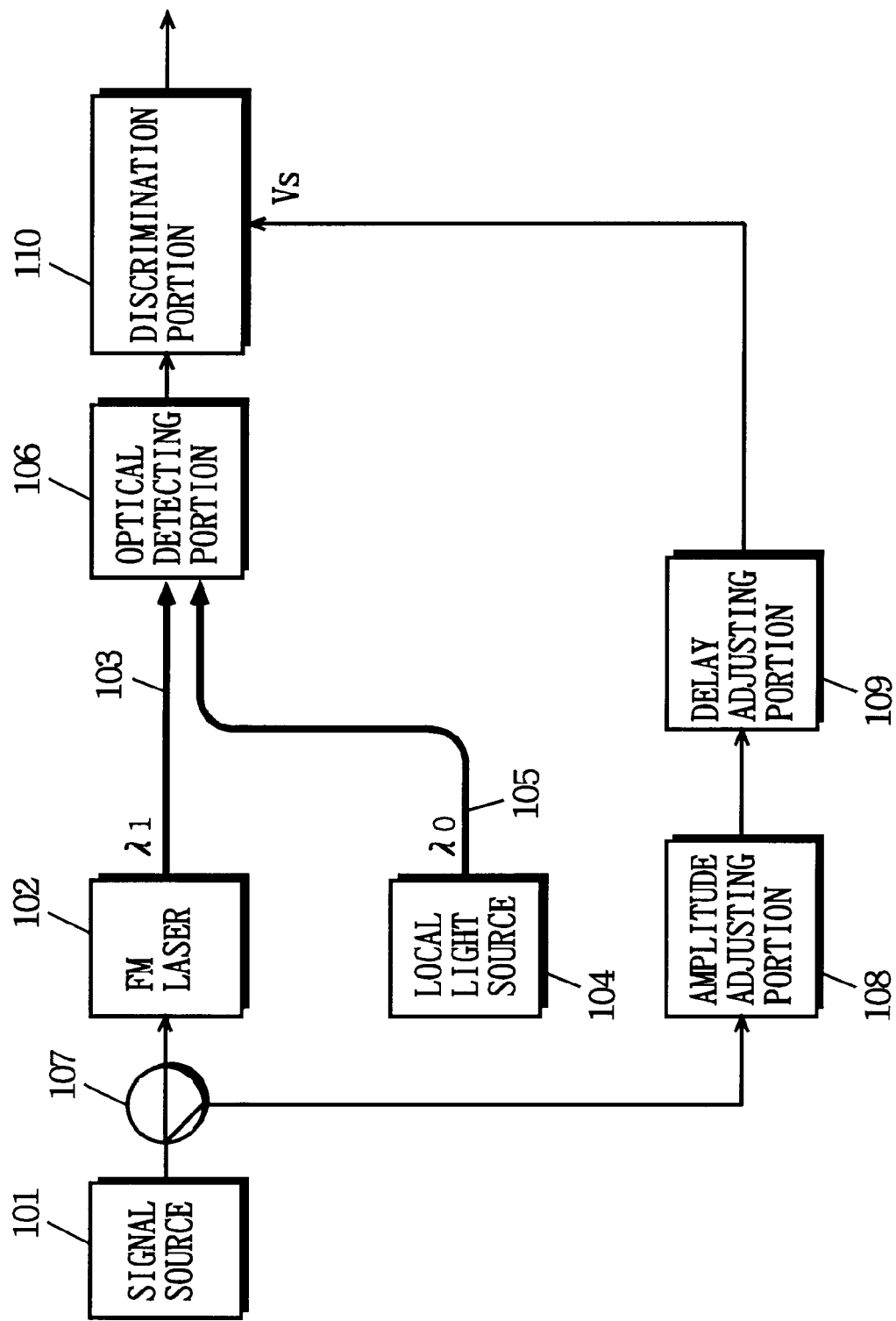
FIG. 1 is a block diagram showing the construction of an FM modulator according to a first embodiment of the present invention.
Figure 2A:
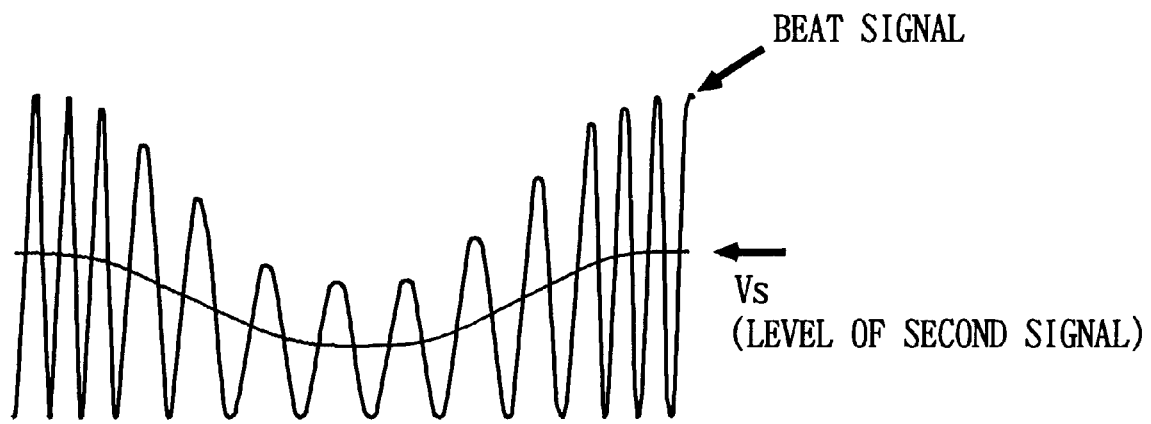
FIGS. 2(a) and 2(b) are schematic diagrams explaining the waveforms of an inputted signal to a discrimination portion 110 and of an outputted signal from the discrimination portion 110 in the FM modulator shown in FIG. 1.
Figure 2B:
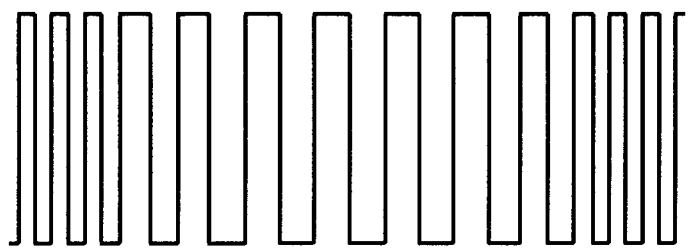
Figure 2C:
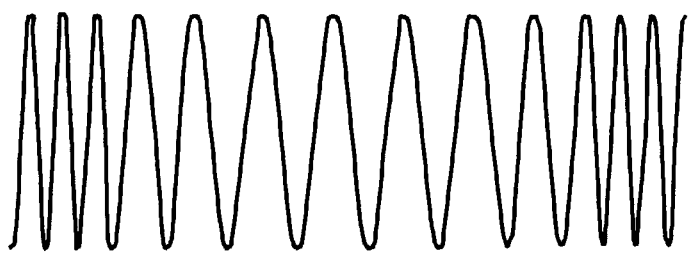
FIG. 2(c) is a diagram explaining the waveform of an output signal from an LPF 311 in an FM modulator shown in FIG. 3.

FIG. 1 is a block diagram showing the construction of a frequency modulator (hereinafter referred to as an FM modulator) according to a first embodiment of the present invention. In FIG. 1, the FM modulator comprises a signal source 101, a frequency modulation laser (hereinafter referred to as an FM laser) 102, a first optical waveguide portion 103, a local light source 104, a second optical waveguide portion 105, an optical detecting portion 106, a branch portion 107, an amplitude adjusting portion 108, a delay adjusting portion 109, and a discrimination portion 110. FIGS. 2(a) and 2(b) are schematic diagrams explaining the waveforms of an inputted signal to a discrimination portion 110 and an outputted signal from the discrimination portion 110 in the FM modulator shown in FIG. 1. FIG. 2(c) is required for describing the operations of an FM modulator according to a second embodiment as described later and hence, the description thereof is omitted herein. The operations of the FM modulator of the construction shown in FIG. 1 will be described.

The signal source 101 outputs an electrical signal which is the original signal to be frequency-modulated. The branch portion 107 branches the electrical signal outputted from the signal source 101 into two electrical signals, and respectively outputs one of the electrical signals to the FM laser 102 as a first signal and outputs the other signal as a second signal. The FM laser 102, which is typically composed of a laser diode, oscillates light having a wavelength $\lambda 1$ in a steady state condition so that an injection current to the FM laser 102 is constant. When the injection current thereto is amplitude-modulated by the first signal, the FM laser 102 outputs an optical signal whose wavelength(optical frequency) is modulated. Therefore, the FM laser 102 outputs an optical frequency modulation signal having the wavelength $\lambda 1$ at the center. And then an optical intensity of the outputted signal from the FM laser 102 is simultaneously modulated as well as its wavelength. The first optical waveguide portion 103 guides the optical frequency modulation signal outputted from the FM laser 102 into the optical detecting portion 106.

The local light source 104 outputs light having a wavelength $\lambda 0$ (unmodulated light) which differs by a predetermined amount $\Delta\lambda$ from the wavelength $\lambda 1$ of the FM laser 102. The second optical waveguide portion 105 guides the unmodulated light from the local light source 104 to the optical detecting portion 106.

Each light guided by the first and second optical waveguide portions 103 and 105 is inputted to the optical detecting portion 106.

The optical detecting portion 106, which is composed of a photodiode operating square-law detection, for example, outputs, when the outputted optical signal from the FM laser 102 and the outputted light from the local light source 104 are inputted thereto, a beat signal by heterodyne detection. The beat signal is an electrical signal having a frequency corresponding to a difference in wavelength $\Delta\lambda$ between both of inputted optical signals.

The amplitude adjusting portion 108 and the delay adjusting portion 109 respectively adjust the amplitude and the amount of propagation delay of the second signal outputted from the branch portion 107 (the details will be described later). The discrimination portion 110 discriminates the beat signal outputted from the optical detecting portion 106 with the instantaneous level of the second signal, whose amplitude and amount of propagation delay are adjusted by the amplitude adjusting portion 108 and the delay adjusting portion 109, as a threshold value Vs which changes on the time basis (see FIG. 2(a)), and outputs the pulsed beat signal (see FIG. 2(b)).

The phase relationship between the first signal and the second signal which are outputted from the branch portion 107, and the gain (or loss) and the amount of propagation delay of the second signal which are adjusted by the amplitude adjusting portion 108 and the delay adjusting portion 109 are so set that a pulse frequency change in the outputted signal from the discrimination portion 110 and a frequency change in the beat signal outputted from the optical detecting portion 106 correspond with each other. That is to say, the branch portion 107 branches so that the first signal and the second signal have an in-phase relationship each other.

The delay adjusting portion 109 adjusts the amount of propagation delay to delay the second signal so that a propagation time t1 elapsed until the first signal reaches the discrimination portion 110 from the branch portion 107 via the FM laser 102 and the optical detecting portion 106 and a propagation time t2 elapsed until the second signal reaches the discrimination portion 110 from the branch portion 107 via the amplitude adjusting portion 108 and the delay adjusting portion 109 are equal to each other.

Furthermore, the amplitude adjusting portion 108 adjusts the amplitude of the second signal so that the amount of instantaneous level variation of the second signal inputted to the discrimination portion 110 and the amount of average value variation of the beat signal inputted to the discrimination portion 110 correspond with each other.

In the FM modulator according to the first embodiment of the above-mentioned construction, the FM modulation signal (the beat signal) outputted from the optical detecting portion 106 is discriminated using as a threshold value Vs of the instantaneous level of the second signal having the same property as that of an average value variation component of the FM modulation signal, and converted into the pulse signal. Consequently, it is possible to output an ideal FM modulation signal whose amplitude variation and average value variation are removed (see FIG. 2(a)). At the FM demodulation, therefore, the waveform is not distorted.

(2) Second Embodiment

Figure 3:
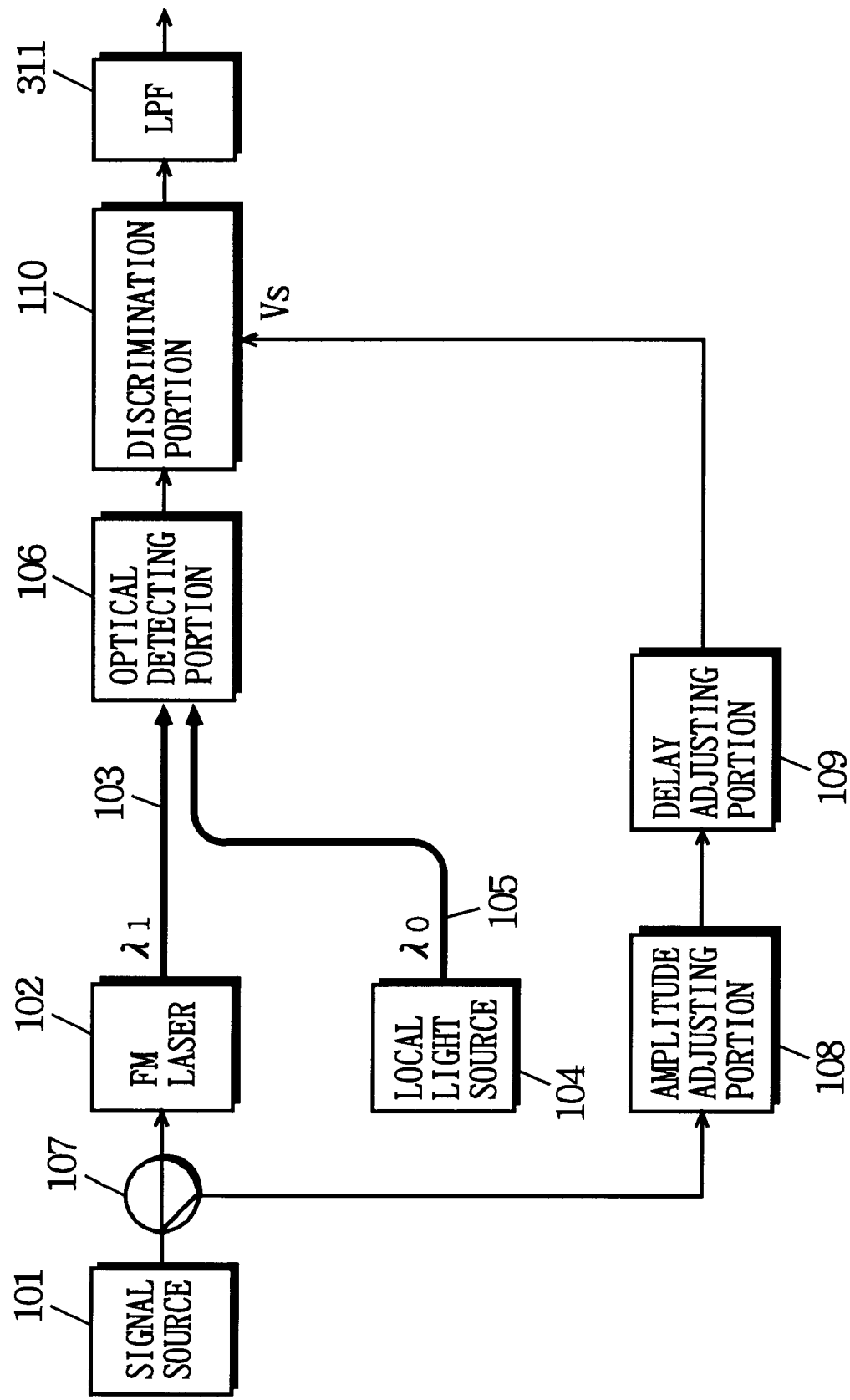
FIG. 3 is a block diagram showing the construction of an FM modulator according to a second embodiment of the present invention.
Figure 4:
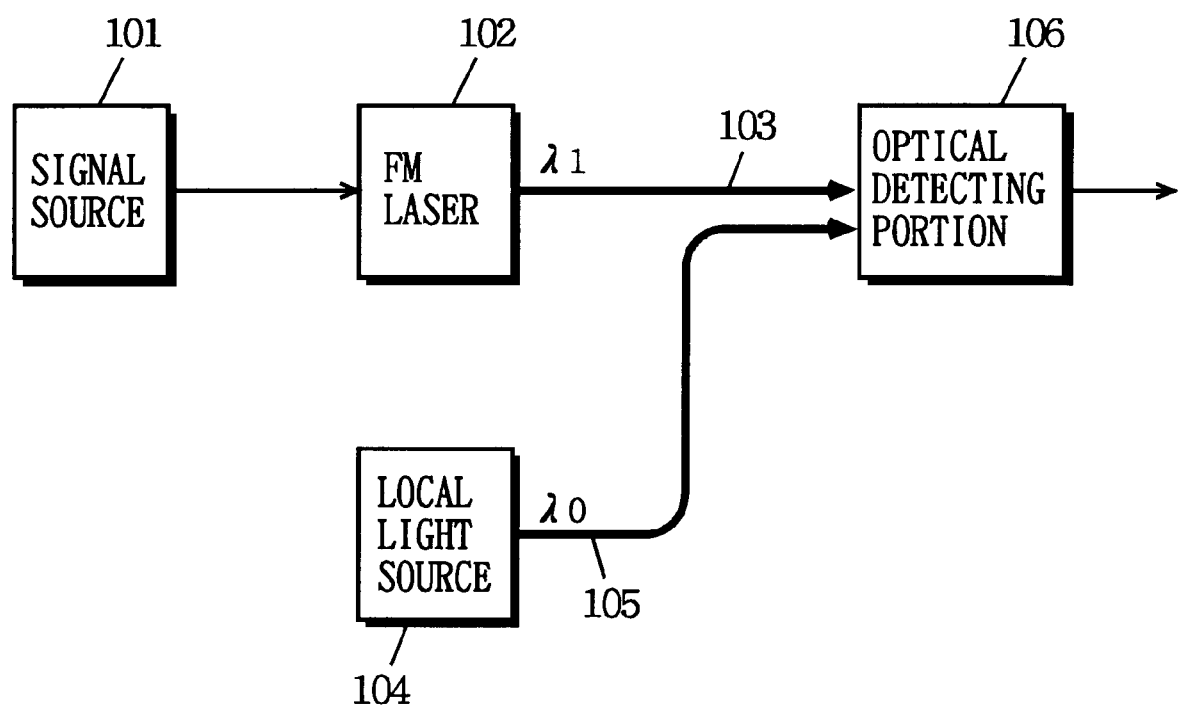
FIG. 4 is a block diagram showing the construction of a conventional FM modulator.
Figure 5A:
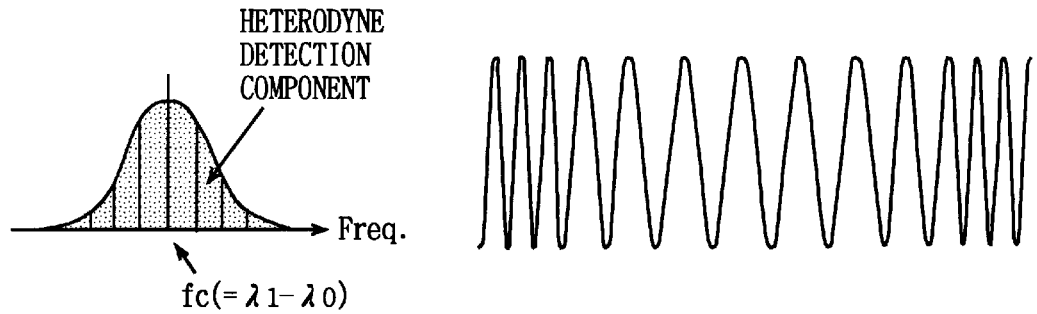
FIGS. 5(a), 5(b) and 5(c) are schematic diagrams explaining the relationship between the spectrum and the waveform of a signal in each portion of the FM modulator shown in FIG. 4.
Figure 5B:
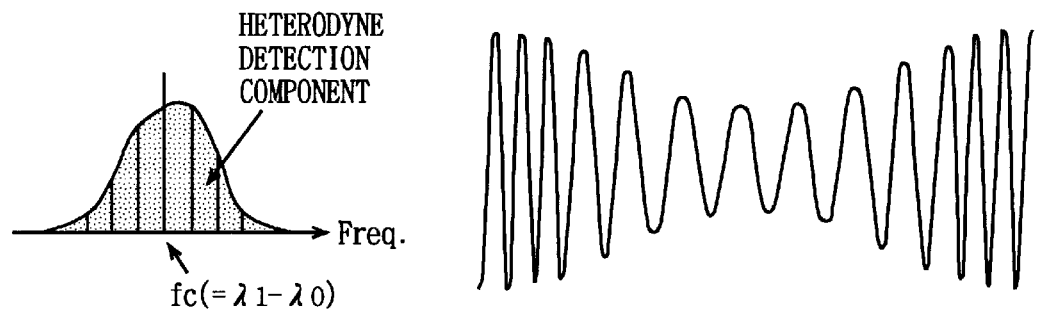
Figure 5C:
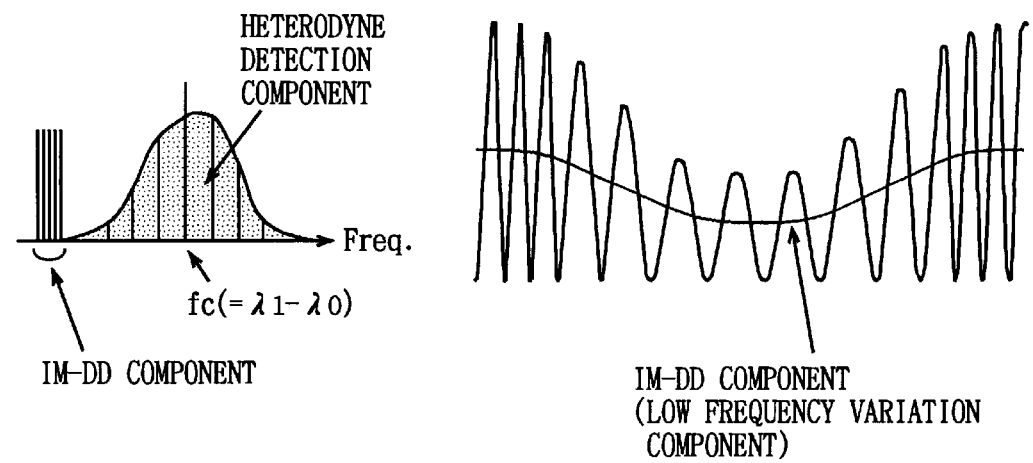
Figure 6:
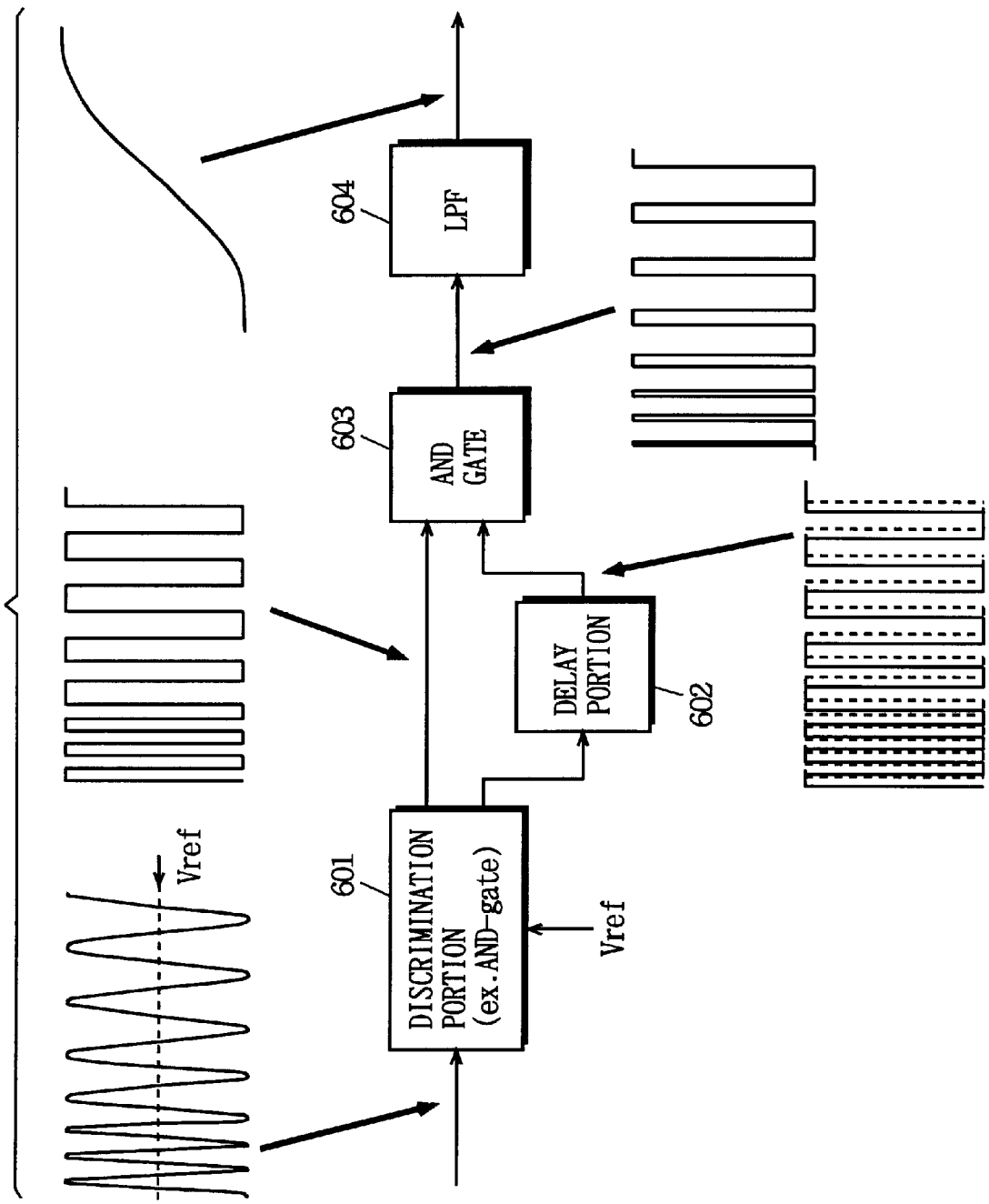
FIG. 6 is a block diagram showing the construction of a typical FM demodulation circuit for demodulating a wide band FM signal generated by the FM modulator shown in FIG. 4.
Figure 7:
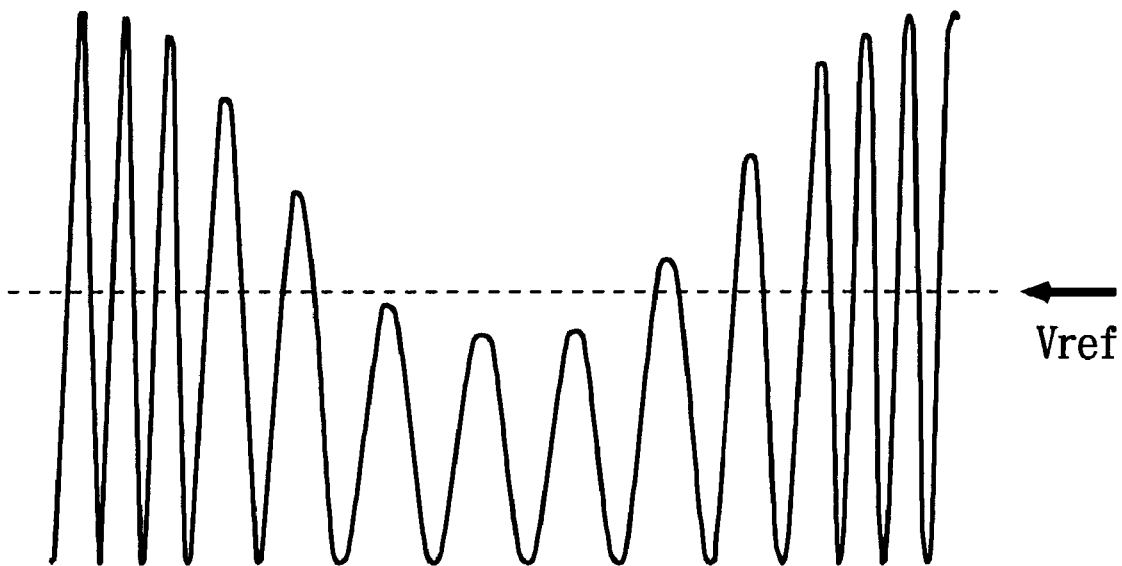
FIG. 7 is a diagram explaining the effect of an amplitude variation component and an average value variation component of a wide band FM signal generated by the FM modulator shown in FIG. 4 on an FM demodulating operation.

FIG. 3 is a block diagram showing the construction of an FM modulator according to a second embodiment of the present invention. In FIG. 3, the FM modulator comprises a signal source 101, an FM laser 102, a first optical waveguide portion 103, a local light source 104, a second optical waveguide portion 105, an optical detecting portion 106, a branch portion 107, an amplitude adjusting portion 108, a delay adjusting portion 109, a discrimination portion 110, and a low-pass filter (hereinafter referred to as an LPF) 311.

The FM modulator shown in FIG. 3 is the same as the FM modulator shown in FIG. 1 except that the LPF 311 is added. Therefore, the same reference numerals are assigned to corresponding portions and hence, the description thereof is not repeated. The operations of the FM modulator according to the second embodiment will be mainly described the difference. FIG. 2(c) is a diagram for explaining the waveform of an outputted signal from the LPF 311 in the FM modulator shown in FIG. 3.

The operations of the FM modulator shown in FIG. 3 differs from the operations of the FM modulator shown in FIG. 1 in the following points. The LPF 311 removes an extra high frequency component which is generated at converting the beat signal into pulse signal through the discrimination portion 110, to output more ideal wide band FM modulation signal (see FIG. 2(c)).

In the above-mentioned first and second embodiments, the amplitude adjusting portion 108 and the delay adjusting portion 109 are located between the branch portion 107 and the discrimination portion 110 (which is not via the FM laser 102 and the optical detecting portion 106), to respectively adjust the amplitude and the amount of propagation delay of the second signal. The amount of instantaneous level variation of the second signal and the amount of average value variation of the beat signal inputted to the discrimination portion 110 can correspond with each other by using the suitable FM laser 102 and the suitable optical detecting portion 106, or the branch portion 107 having a suitable branch ratio. Further, the amount of propagation delay can be adjusted by adjusting the length of the first optical waveguide portion 103. Therefore, the amplitude adjusting portion 108 and the delay adjusting portion 109 may, in some cases, be omitted. Furthermore, such a structure is considered that the amplitude adjusting portion 108 and the delay adjusting portion 109 are provided between the branch portion 107 and the FM laser 102 or between the optical detecting portion 106 and the discrimination portion 110, for example, as required, to adjust the amplitude or the amount of propagation delay of the first signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frequency modulator comprising:

a signal source for outputting an electrical signal;

a branch portion for branching the electrical signal outputted from said signal source into a first signal and a second signal in a predetermined phase relationship;

a frequency modulation laser FM laser) which is capable of oscillating light having a wavelength $\lambda 1$ in a steady state condition so that the inputted electrical signal does not change the uniquely converting an amplitude change in the inputted electrical into an optical frequency change as well as uniquely converting the amplitude change into an optical intensity change, for converting said first signal into an optical signal and outputting the optical signal;

a first optical waveguide portion for guiding the outputted optical signal from said FM laser;

a local light source for outputting light having a wavelength $\lambda 0$ which differs by a predetermined amount $\Delta\lambda$ from the wavelength $\lambda 1$ of light from said FM laser;

a second optical waveguide portion for guiding the outputted light from said local light source;

an optical detecting portion which is capable of converting an optical intensity change in the inputted light into a current amplitude change by operating square-law detection and producing, when two optical wavelengths are inputted thereto, a beat component at a frequency corresponding to a difference in wavelength between the two optical wavelengths, for outputting, when the outputted optical signal from said FM laser guided by said first optical waveguide portion and the outputted light from said local light source guided by said second optical wavelength portion are inputted, a beat signal at a frequency corresponding to the difference in wavelength $\Delta\lambda$ between the two optical signals; and a discrimination portion for converting, when the beat signal outputted from said optical detecting portion and the second signal outputted from said branch portion are inputted, the inputted beat signal into a pulsed beat signal, utilizing the instantaneous level of the inputted second signal as a threshold value.

2. The frequency modulator according to claim 1, further comprising:

an amplitude adjusting portion for amplifying or attenuating the second signal outputted from said branch portion by a predetermined gain or loss to adjust the amplitude of the second signal; and a delay adjusting portion for adjusting the amount of propagation delay of the second signal outputted from said branch portion, the predetermined gain or loss and the amount of propagation delay being so set that a frequency change in the outputted pulse signal from said discrimination portion and a frequency change in the beat signal correspond with each other.

3. The frequency modulator according to claim 2, wherein:

said branch portion branches the inputted electrical signal into first and second electrical signals which have an in-pulse relationship each other, said delay adjusting portion adjusts the amount of propagation delay to delay the second signal so that a propagation time t1 elapsed until the first signal reaches said discrimination portion from said branch portion via said FM laser and said optical detecting portion and a portion and a propagation time t2 elapsed until the second signal reaches said discrimination portion from said branch portion via said amplitude adjusting portion and said delay adjusting portion are equal to each other, and said amplitude adjusting portion makes such an adjustment that the amount of variation in the level of the second signal inputted to said discrimination portion corresponds with the amount of variation in the average value of said beat signal inputted to said discrimination portion.

4. The frequency modulator according to claim 1, further comprising:

a low-pass filter for passing, when the outputted signal from said discrimination portion is inputted, only a low frequency component of not more than a predetermined frequency.

5. The frequency modulator according to claim 2, further comprising:

a low-pass filter for passing, when the outputted signal from said discrimination portion is inputted, only a low frequency component of not more than a predetermined frequency.

6. The frequency modulator according to claim 3, further comprising:

a low-pass filter for passing, when the outputted signal from said discrimination portion is inputted, only a low frequency component of not more than a predetermined frequency.

* * * * *